(12) United States Patent
Andersson et al.

(10) Patent No.: US 7,424,708 B2
(45) Date of Patent: Sep. 9, 2008

(54) METHOD AND DEVICE FOR PROVIDING/RECEIVING MEDIA CONTENT OVER DIGITAL NETWORK

(75) Inventors: Per Johan Andersson, Lindome (SE); Magnus Carlsson, Skene (SE); Carlo Pompili, Stockholm (SE); Konstantin Zervas, Göteborg (SE)

(73) Assignee: Handmark, Inc., Kansas City, MO (US)

( * ) Notice: Subject to any disclaimer, the term of this patent is extended or adjusted under 35 U.S.C. 154(b) by 733 days.

(21) Appl. No.: 10/363,324

(22) PCT Filed: Sep. 11, 2001

(86) PCT No.: PCT/SE01/01934

§ 371 (c)(1),
(2), (4) Date: Aug. 7, 2003

(87) PCT Pub. No.: WO02/23909

PCT Pub. Date: Mar. 21, 2002

(65) Prior Publication Data
US 2004/0030798 A1 Feb. 12, 2004

(30) Foreign Application Priority Data
Sep. 11, 2000 (EP) .................................. 00850148

(51) Int. Cl.
G06F 9/445 (2006.01)
G06F 9/44 (2006.01)

(52) U.S. Cl. .................. 717/174; 717/171; 709/203

(58) Field of Classification Search ......... 717/168–177; 709/203, 231–234
See application file for complete search history.

(56) References Cited

U.S. PATENT DOCUMENTS 5,727,129 A 3/1998 Barrett et al.

(Continued)

FOREIGN PATENT DOCUMENTS

| WO | 98/28906 | 7/1998 |
|---|---|---|
| WO | WO 99/15968 | 4/1999 |
| WO | 0039666 | 7/2000 |
| WO | 0103011 | 1/2001 |
| WO | 0154403 | 7/2001 |

OTHER PUBLICATIONS

Naghshineh et al.; "End-to End QOS Provisioning in Multimedia Wireless/Mobile Networks Using an Adaptive Framework"; Nov. 1997; pp. 72-81; © 1997 IEEE.

Primary Examiner—Anil Khatri
(74) Attorney, Agent, or Firm—Polsinelli Shalton Flanigan Suelthaus PC

(57) ABSTRACT

Example embodiments relate to a method for providing media content to a user over a digital network, which media content may be provided by a media content server, organized and selected by an intermediate node in accordance to previously stored user preferences, and delivered to a client operated by the user. The method may define a personalized media package structure, communicate a first package having the personalized media package structure to the client, receive status information from the client, the status information describing a user action, adapt the personalized media package structure in response to the user action, and communicate a second package having the adapted personalized media package structure to the client. With such arrangement, the user may experience a highly personalized media playback, with a minimum of cost related to network transmission. Moreover, by the implementation of the status information communication to the personalization server, the media package structure may be continually updated in accordance with the user's consumer pattern.

14 Claims, 5 Drawing Sheets

U.S. PATENT DOCUMENTS

| | | |
|---|---|---|
| 5,790,935 A | 8/1998 | Payton |
| 5,802,292 A | 9/1998 | Mogul |
| 5,848,396 A * | 12/1998 | Gerace ........................ 705/10 |
| 5,878,223 A | 3/1999 | Becker et al. |
| 5,978,841 A | 11/1999 | Berger |
| 6,023,726 A | 2/2000 | Saksena |
| 6,055,569 A | 4/2000 | O'Brien et al. |
| 6,182,122 B1 | 1/2001 | Berstis |
| 6,314,094 B1 | 11/2001 | Boys |
| 6,629,097 B1 | 9/2003 | Keith |
| 6,721,780 B1 | 4/2004 | Kasriel et al. |
| 6,735,628 B2 * | 5/2004 | Eyal ........................... 709/223 |
| 6,735,766 B1 * | 5/2004 | Chamberlain et al. ....... 717/173 |
| 6,747,597 B2 | 6/2004 | Choi |
| 6,769,009 B1 * | 7/2004 | Reisman ..................... 709/201 |
| 6,769,019 B2 | 7/2004 | Fergusson |
| 6,917,960 B1 | 7/2005 | Decasper et al. |
| 7,047,485 B1 | 5/2006 | Palmer |
| 7,062,765 B1 * | 6/2006 | Pitzel et al. .................. 717/177 |
| 7,099,946 B2 * | 8/2006 | Lennon et al. .............. 709/227 |
| 7,174,534 B2 | 2/2007 | Chong et al. |
| 2004/0030798 A1 | 2/2004 | Andersson et al. |

\* cited by examiner

METHOD AND DEVICE FOR PROVIDING/RECEIVING MEDIA CONTENT OVER DIGITAL NETWORK

TECHNICAL FIELD

The present invention relates generally to techniques for playback of and navigation among packages of media content, accessed over a data network.

More specifically, the invention relates to a method and a device for providing and receiving media content to a user over a digital network, which media content is provided by a media content server, organized and selected by an intermediate node in accordance to previously stored user preferences.

TECHNICAL BACKGROUND

There are basically two techniques for accessing media content over a data network, e.g. the Internet; streaming, which means that the user receives a continuous stream of media (equivalent to listening to radio), and clip-by-clip downloading which means that the user selects and downloads the media content clips one by one (equivalent to buying each song on a CD separately). None of these techniques by itself offers the user any satisfying personalized media experience.

Different technologies have therefore been developed to accomplish a more personalized media access, with the common object of delivering an optimized media experience to the user, normally including a selection of the media content that is deemed most interesting for the user. This object has been particularly highlighted as the access of mobile Internet has increased.

According to a first approach, the user utilizes a handheld device that normally is not connected to the network. Instead, the device is connected sporadically to the network, typically using docking equipment of some kind. An example of this approach is the AvantGo system, applicable for example with a Palm Pilot device. The user initiates an account at the AvantGo server, and selects a number of servers from which he/she would like information from. This information, which has a special memory-economic format, is then downloaded to the AvantGo server and continually updated. Each time the user docks the Palm Pilot, the current information is downloaded to the Palm Pilot. Then, with the Palm Pilot disconnected from the network, the user can browse among the downloaded pages, for example during a bus ride home. Obviously, this approach has severe limitations in terms of dynamics and media quality. Firstly, as the device is not connected during browsing, the information contents can not be changed. Secondly, the media information is limited to text and simple graphics, in order to be compatible with the docking procedure and to be sufficiently compact to allow a great number of pages to be stored in the Palm Pilot. Also, the docking routine is typically performed while the user waits, for example before leaving his/her workplace for the day. Therefore, it is desirable that the docking routine is performed as quickly as possible, making it too time-consuming to transfer media contents of any greater volume, as sound, video etc., even though the connection itself is of high quality.

According to a second approach, the user uses a handheld device to actively access all available information on the network. The device, for example a WAP-telephone or a GPRS-device, can be connected continuously and works as a handheld network browser. This approach puts practically no restraints on the amount of information available to the user, except restrictions in the form of network capacity and display/navigation limitations of the handheld device. At the same time, however, the user is requested to actively take part in the information seeking, by browsing the Web. As the modern information seeker typically is in a hurry, there is a need for a more personalized media access. Also, when browsing in search of a subject, it is a known phenomenon that the Internet can lead a user away in the wrong direction. When sitting at home, this is normally not a problem, but a user on the run is not ready to wait for the media experience. A contributing factor to the impatience is the fact that a mobile Internet connection normally is charged in relation to how much information the user downloads, making it economically preferable to download selectively.

A third approach relates to "channels", e.g. Active Channels in Windows 98, originally developed for the Internet user who is not constantly connected, in order to maximize the use of the connection. A channel is a kind of subscription of a media content, such as a magazine or a news station. By initializing a channel, the user requests this media content to be downloaded to the client while the user is on-line, with a minimum of disturbance of the user's other on-going Internet communication. Then, when the user goes off-line, the media content is available from a client memory device (e.g. the hard disc). The channel concept can be implemented on handheld devices, and then offers a selected media content to the user. The channel content can be further personalized by e.g. cookies, thereby making the media experience even more optimized. A problem with the channel approach is that although the user is given a more efficient media experience, there is still a risk of downloading excessive information. No matter how personalized a channel is designed, if a user decides not to study its contents, these contents were downloaded for no purpose, causing an unnecessary cost.

Another problem, present in all media information delivery over a permanent mobile link, is the risk of deterioration of the connection quality. This can occur when a car enters a tunnel, or when a moving person is located in between the zones of different cells in a cellular network (e.g. GPRS). If the line quality decreases, normal browsing can be tediously slow, making a satisfying media experience difficult.

Additionally, in order to play back the media content the user's hardware device (e.g. a PC or a handheld device) must include a media player supporting the specific media format. The media player is a computer program running on the hardware device, e.g. an MP3 player. If the media player does not support the media. format, the user will not be able to benefit from the download, causing unnecessary cost in terms of connection capacity.

The media content is typically stored as a sequence of data bits, a file, formatted according to a pre-defined standardized data format, e.g. WAV or MP3. The file typically contains one and only one media content clip, e.g. a song, together with some very limited information about the media content itself, e.g. title, artist and genre.

The media content is typically played clip-by-clip, i.e. one file is selected and opened in the media player (the clip is played) and when the end of the file is reached the audio clip (e.g. the song) is finished. In order to play the next clip, the clip has to be selected and started explicitly. Some media players support a playlist concept where the clips can be played in a certain pre-defined order but these playlists are extremely limited, as they can only express a linear (one dimensional) sequence of clips. Furthermore, there exists no standard data format to define a playlist.

Some of the above problems have been addressed by MPEG (Moving Picture Expert Group), and are mentioned in the report MPEG-21 Multimedia Framework, Beijing, 2000.

SUMMARY OF THE INVENTION

A general object of the present invention is to overcome some of the above problems, and to offer a user a satisfying media experience.

A further object of the invention is to accomplish a satisfying media experience to a low cost, i.e. to avoid unnecessary downloading of media contents to a media player.

These objects are achieved by a method of type mentioned by way of introduction, comprising the steps of defining a personalized media package structure, communicating a first package having said personalized media package structure to the client, receiving status information from the client, said status information describing a user action, adapting said personalized media package structure in response to said consumption behavior, and communicating a second package having said adapted personalized media package structure to the client.

According to the invention, the user can experience a highly personalized media playback, with a minimum of costs related to network transmission. By the implementation of the status information communication to the personalization server, the media package structure is continually updated in accordance with the user's consumer pattern, i.e. if the user selects to playback media of a certain type on a subject, the structure will be adapted to include more media objects of this type on all subjects currently included in the users personal profile. As a result, more media contents related of this type is downloaded to the personalization server from the one or several content providers. However, it is only if and when the user by navigation requests media of this type that the media contents is transferred to the client. Therefore, the user will only pay for requested media contents. At the same time, however, the media contents that the user requests by navigating, will always be adapted to the user's media consumer pattern, and thus the user will have a highly relevant and satisfying media experience without excessive browsing.

The second package can preferably, in response to user action, include playable media subjects, organized according to said adapted personalized package structure. The different packages may therefore differ both in structure and in content. This enables media transfer which is highly adaptable to user media consumption behavior.

The status information can further include an indication of the currently available network transmission speed, and wherein media subjects unsuitable for the available transmission speed are replaced or excluded from said package. The replacement can according to one approach consist of a conversion of media format, such as a compression to a higher degree, resulting in lower quality but less number of bytes.

By adapting the transmitted media contents to the available transmission speed, excessive delays at the client are avoided. During periods when the transmission speed is lower than usual, wideband media contents (e.g. video clips, audio files with high sampling rates) are retained at the personalization server. The user will thus have a significantly reduced media experience, but this is normally a better alternative than having the media content transmission completely halted by deteriorating network capacity.

The status information can further include an indication of the media formats supported by the client media player, and wherein media subjects having a format not supported by said media player are replaced or excluded from said package. By communicating to the personalization server information about the client and the client media player, the media contents transmitted to the client can be further adapted. For example, when using a media player not capable of playback of video clips (e.g. a mp3-player without display), transmission of such media contents would be a waste of connection cost.

The status information can further include an indication of the type of situation the user is currently in. Especially important is to inform the personalization server of any activities that can be assumed to influence the user's ability to consume media contents. The user that is currently driving a car will normally appreciate a somewhat different mix of media contents than a user sitting on a bus, even if the client hardware and software are significantly similar. By adapting the media contents in accordance with information about the current user environment, it will be possible to obtain a further enhanced media experience.

Another aspect of the invention relates to a corresponding method for receiving media contents.

Another aspect of the invention are devices comprised in the network, including means for performing the steps according to the above methods. These devices can form part of a fixed data network (e.g. the Internet) or of a mobile network.

Yet another aspect of the invention are computer program products, comprising software code portions for performing the method according to the invention, when said product is run on a computer. Such computer program products are preferably directly loadable into the internal memory of a computer, and can for example be distributed over a network or on a digital information carrier such as a CD.

BRIEF DESCRIPTION OF THE DRAWINGS

Further aspects of the invention will be described in the following, with reference to a preferred embodiment, illustrated in the appended drawings.

DETAILED DESCRIPTION OF A PREFERRED EMBODIMENT

Figure 1:
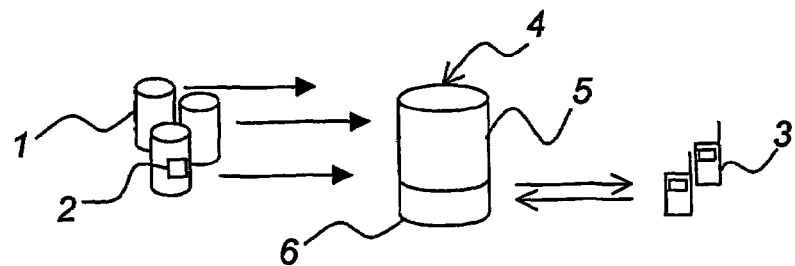
FIG. 1 is a block diagram of the general information flow in a system according to the invention.

Depending on the implementation, a system according to the present invention could have any of a number of different information flow structures, including different sets of components (nodes). In the following description, a structure according to FIG. 1 is assumed, including one or several media content servers (referred to as publisher nodes 1), containing media contents 2 that are transferred to one or several clients 3 according to the inventive method. Between these two endpoints an intermediate node 4 is arranged, comprising a personalizing component 5 adapted to select media contents from the published material according to user preferences made available to the node, and a feeder component 6, adapted to secure an optimal communication with the client 3.

Figure 2:
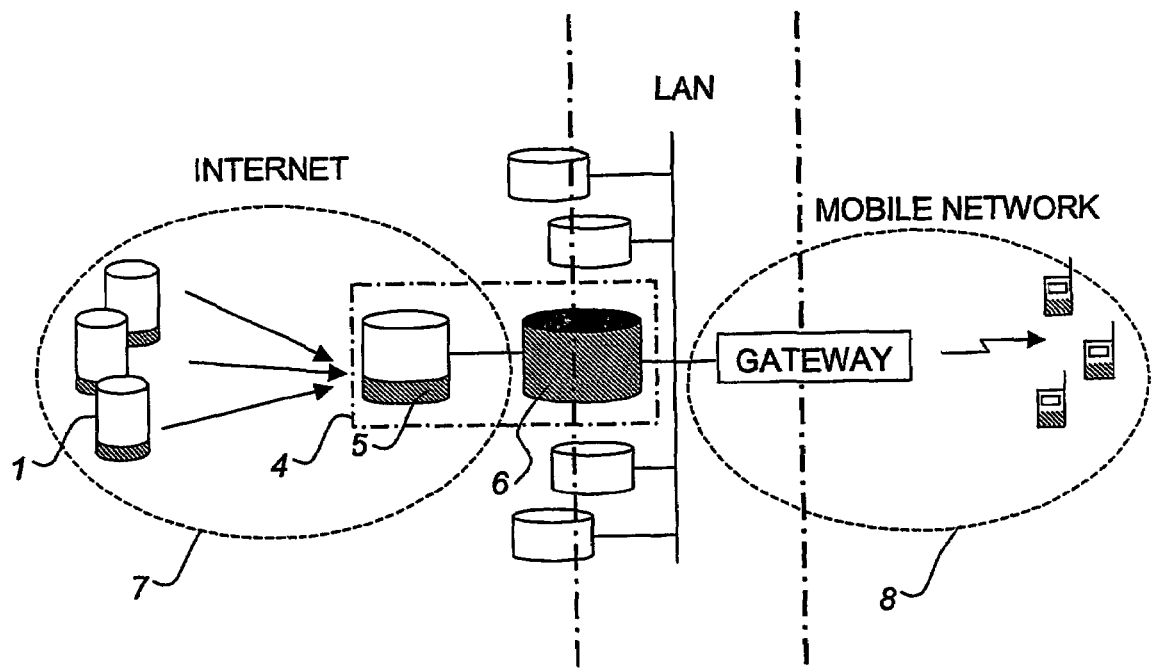
FIG. 2 is a block diagram of a media distribution network in which the invention is applicable.

The above structure is preferably implemented in a network of the kind illustrated in FIG. 2, including a fixed data network 7, e.g. the Internet, and a mobile data network 8, e.g. a GPRS or UMTS network. From FIG. 2 it is apparent that the publisher nodes 1 and the personalization component 5 of the intermediate node 4 form part of the fixed network. The feeder component 6 of the intermediate node 4 is the bridge between the fixed and the mobile part of the system, and communicates with e.g. a GGSN (Gateway GPRS System Node) of a GPRS network. As a part of the interface between fixed and mobile, the feeder 6 typically belongs to the mobile network operator, and is therefore shown as a separate physical unit in FIG. 2. The client 3 is a cellular communication device, e.g. a GPRS phone. In FIG. 2, shaded areas indicate where the software described hereafter will reside.

Figure 3:
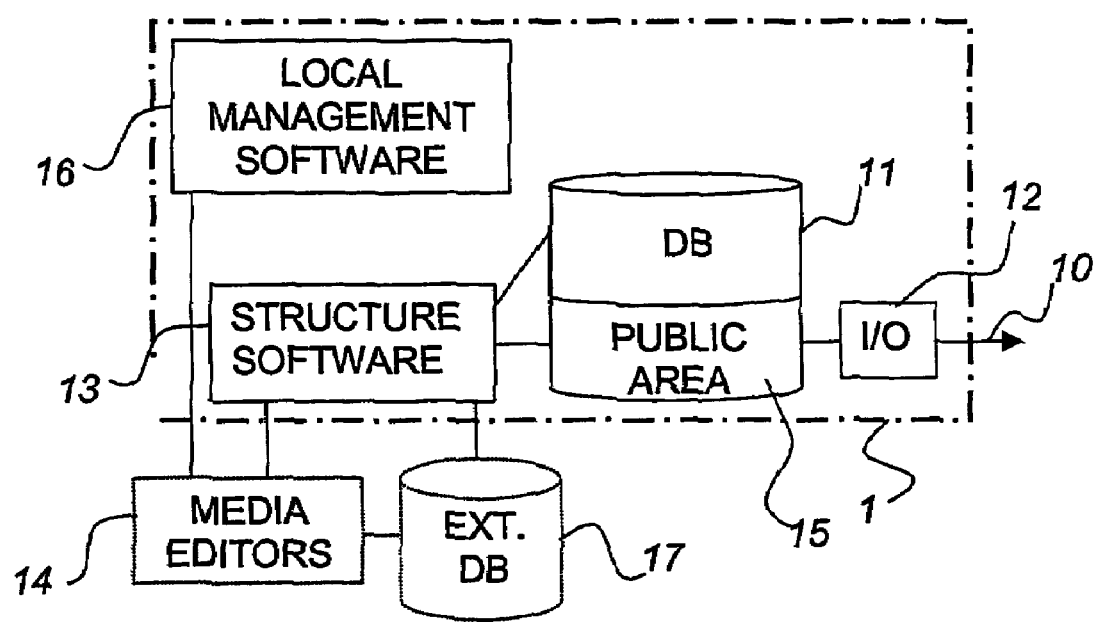
FIG. 3 is a publisher node according to the invention.

A publisher node 1 according to a preferred embodiment is illustrated in FIG. 3. Each publisher node creates and distributes packages 10 with a defined media structure to one or several personalization nodes 4.

This basic media package structure is used in all processing and communicating of media contents according to the invention. The media package structure supports bundling items (also referred to as subjects) of associated media content into one logical single file, which is transferred to the client. The media package structure defines the relation between the media subjects and the navigation structure of a media package. In the preferred embodiment, the structure is implemented as an XML Data Translation Definition.

Figure 4:
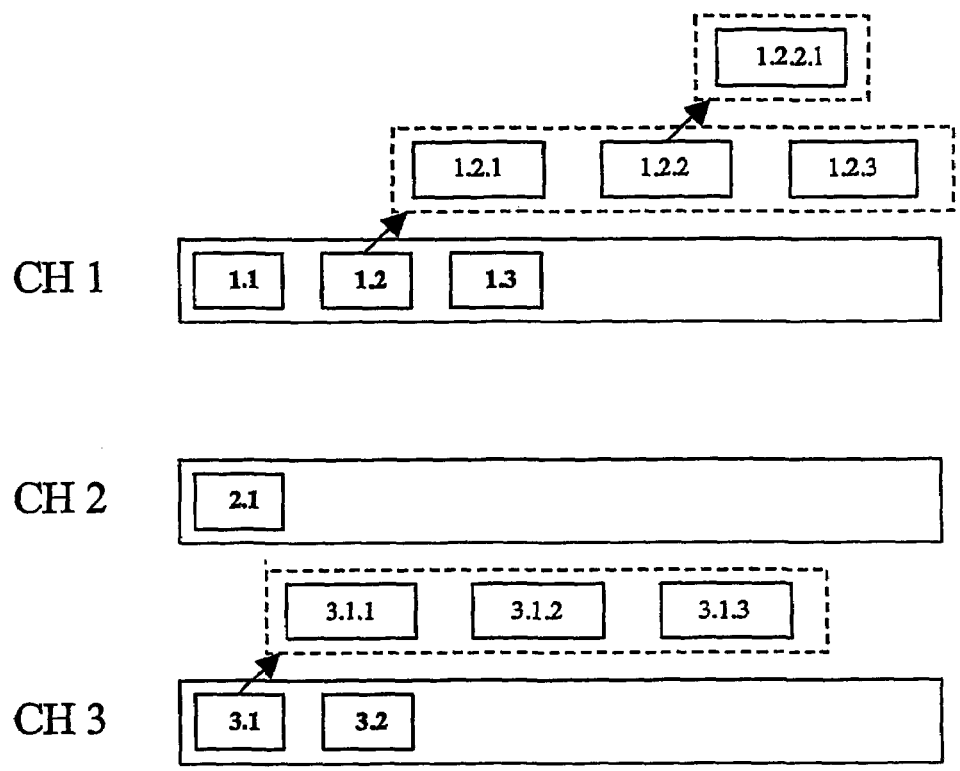
FIG. 4 is an example of a media package structure according to an embodiment of the invention.

As shown in FIG. 4, the clips in a media package 10 are organized in a number of content provider specific channels (CH 1, . . . ), e.g. CNN Sport or MTV Top 25. A channel contains a number of subjects (1.1, . . . ), e.g. a sports news clip or a song, and each subject can have a number of associated subjects (1.1.1, . . . ), e.g. related sport news clips that give more detailed or related information about the subject.

The subjects have a predefined playback order (1.1, 1.2, 1.3 etc), and are in this way similar to a broadcast. However, the multilevel structure allows a move into a parallel path, changing the broadcast to, e.g. 1.2.1, 1.2.2, 1.2.3 etc).

A subject can also be assigned an expiration tag, making it obsolete after a certain time. This expiration tag can be used throughout the system, to avoid delivering media contents that are "out of date".

Figure 5:
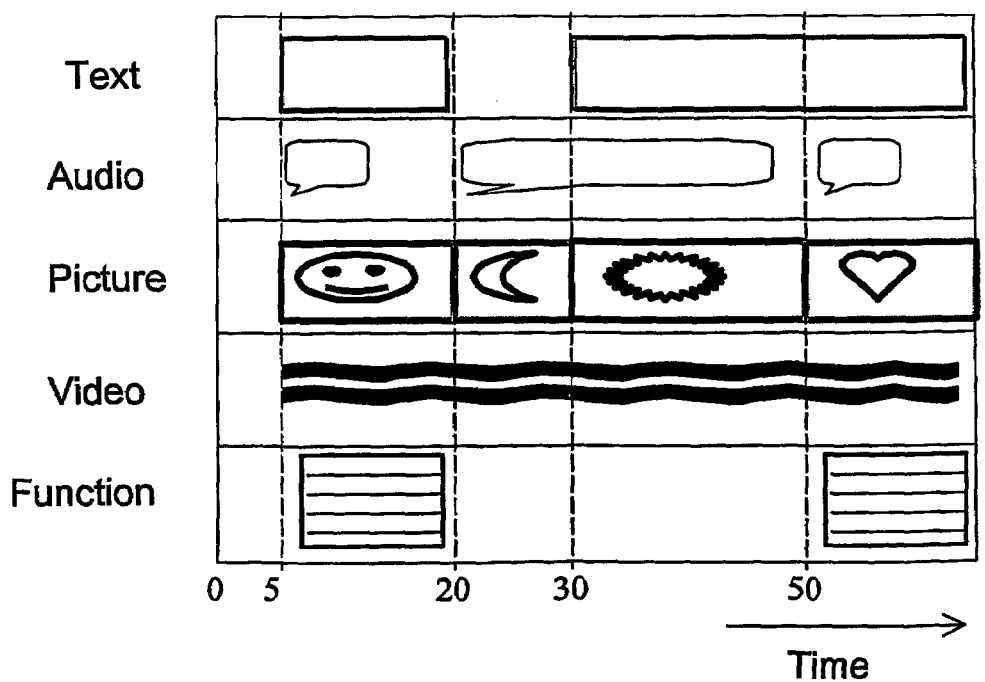
FIG. 5 is another illustration of the media package structure in FIG. 4.

As shown in FIG. 5, each subject also contains a number of media representation layers, e.g. text, audio and picture. The layers enable the same news clip to be represented in different ways, making it possible to choose from different representations in a suitable way, depending on circumstances such as the capability of the media player, the access capacity or the user's choice. This process will be further described below.

Within a layer the media content is further divided into sequences organized and synchronized according to a timeline. Sequences are the smallest pieces of a media package and are equivalent with the media files of today, e.g. MP3 files. Combining and synchronizing sequences on different layers allows rich media shows to be produced. For example, today's news channels on TV often build up their news clips by combining sequences of audio and still pictures that change based on the news content. These news clips could be produced based on the media package format described above.

The lowest layer in FIG. 5, the function layer, allows subject dependent interactive functions to be included in the subject and also to be synchronized with other sequences. As an example, while listening to a news clip, a menu related to the news clip can appear, allowing items of choice to be saved (archived) on the media player for future use or purchased directly from the content provider.

Part of an XML file associated with FIGS. 4-5 could look like the example below.

```
<CHANNEL name='CH1'>
    <SUBJECT id='1.1'...>
        <LAYER type='audio'...>
            <SEQUENCE start='0.30' stop='1.30' file='a1.mp3'/>
        </LAYER>
    </SUBJECT>
    <SUBJECT id='1.2'>
    ...
</CHANNEL>
<CHANNEL name='CH2'>
...
</CHANNEL>
```

Returning to FIG. 3, a publisher node 1 includes a database 11, and means 12 for connection to the Internet. The node 1 is further provided with software 13 for structuring the media contents in the way described above. A media content provider, such as a news-station or TV-channel, employ media editors 14 to produce media contents in the form of subjects of different types in the database 11. The software 13, possibly with the aid of the media editors 14, creates packages 10 with the XML structure mentioned above and these packages 10 are then made public, i.e. moved to a public memory location 15 of the database 11 which is available over the Internet. Typically, a package 10 is created for every channel that the media content provider distributes.

Additionally, the publisher node includes means 16 for local management functions like setting up and maintaining user groups and new personalization node connections, controlling media editor access, backup routines etc.

The publisher node can have means for connection with an external content database 17, where additional media contents can be found. This can be for example a publicly available database, or a database to which the media content provider has access.

Figure 6:
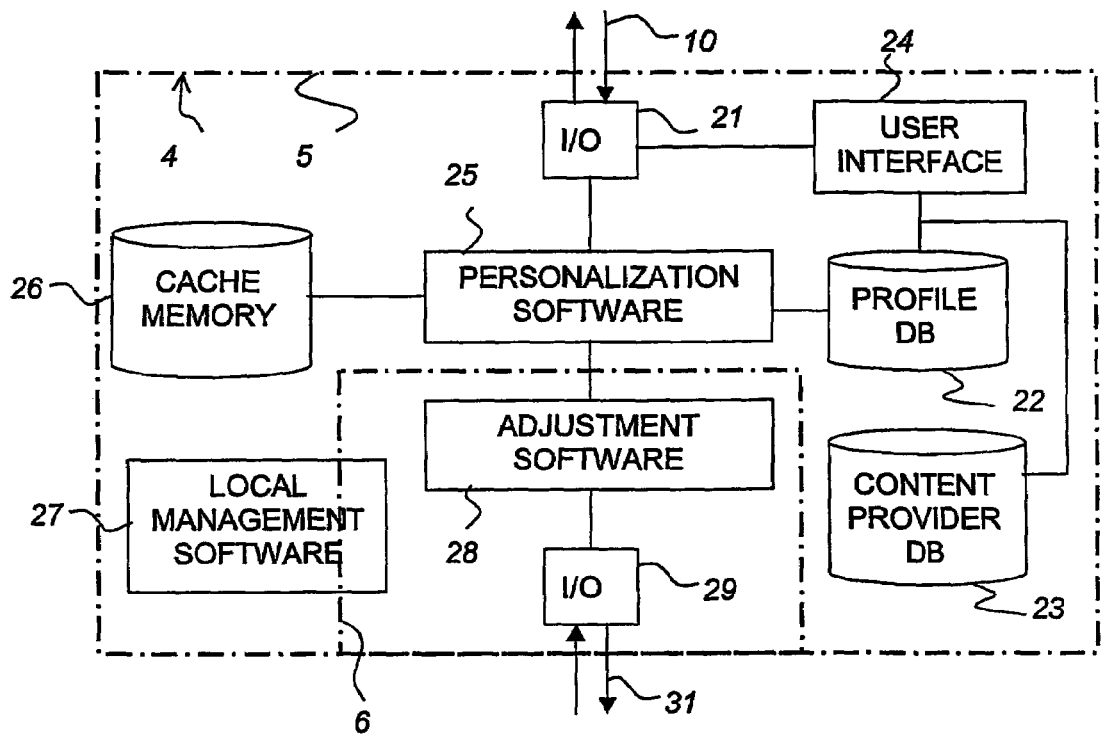
FIG. 6 is a personalization node according to the invention.

An intermediate node 4 according to a preferred embodiment is illustrated in FIG. 6, and includes a personalization component 5 and a feeder component 6. These two components both provide personalization service to the end user but have somewhat different functions and are therefore separated in this description. As the feeder component 6 is closely related to the communication with the mobile network, it is preferably also realized physically separated from the personalization component 5, which can be for example a permanently connected Internet server.

The personalization component 5 is easily embodied as an Internet portal with open std interfaces 21 and thereby accessible from any kind of browser (HTML, WAP, VoiceXML). The personalization component 5 includes a user database 22, where user profiles as well as status information about the user consumption behavior are stored, and a content provider database 23 including the content providers and the categories of media contents that they provide (also referred to as channels).

A user interface 24 is adapted to manage a secure login and authorization procedure and to give a user access to his/her user profile information in order to update this information. Content providers can also login using the interface 24, in order to set up new channels or update contents of existing channels.

The personalization component 5 further includes software 25 to perform a personalization of media packages which are to be sent to a client 3. The distribution of media packages can be of different kinds. According to one embodiment (not shown) all media packages are stored in the personalization node 4. According to another embodiment (FIG. 6) packages are sent directly from the publisher node 1 to a client 3, and are only intercepted by the intermediate node 4. In this case, an "intelligent caching" using a cache memory 26 takes place in the intermediate node 4. The package is intercepted by the personalization node 4, and a user ID or the like is read from the destination header or the like. The corresponding user profile is recalled from the user profile database 22, and the package is adjusted according to the user profile.

Additionally, in analogy with the publisher node, the personalization component 5 includes means 27 for local management functions, like system administration, backup routines etc.

The feeder component 6 contains an "intelligent" filter 28 that optimizes the data transferred through the network. For this purpose, it includes means 29 for receiving status information 30 from the client, and sending personalized, adapted media packages 31 to the client in response to this status information. If the intermediate node 4 consists of one physical unit (server), the feeder component 6 is just a part of the software running on the server. If, on the other hand, the feeder component 6 is separated from the personalization component, there is also a need for securing network communication with the personalization component. This connection can include means for caching information, similar to the process described in relation to the personalization component. The status information 30 includes statistics regarding requested media contents and the media packages are adapted to the received information. For example, subjects that recently have been received by the client can be excluded in order to avoid sending the same contents twice. Also, if a user seldomly accesses media contents of a certain type, the amount of media contents of this type can be restricted or eliminated completely.

The adaptation process is connected to the media package structure mentioned above. A package that is sent to the client may include a section of a multilevel structure as the one illustrated in FIG. 4. However, the structure need not be completely filled with media subjects (video clips, audio clips etc), but only a few subjects are included. As the user navigates in the structure, and thus consumes one of the media subjects, the package is resent from the feeder, but this time with a slightly adjusted structure, and with a few new subjects. If the user does not act, the broadcast, consisting of the predetermined playback of sequential subjects, will continue, and regularly be completed with additional subjects. In this way, the user navigates in quite a sparse structure with little content, but is always "surrounded" by new media subjects.

The statistics on user behavior can be communicated to the user database in the personalization component, from where it can influence the personalization of media packages at an earlier stage. Thus a more efficient personalization is accomplished, with a continuous feedback from the user.

The status information from the client can also include various technical factors, such as:
- connection capacity (speed, etc)
- memory capacity of the user device
- processing capacity of the user device
- available software components of the user device
- traffic volume These factors permit the software to adapt the media packages according to prevailing technical circumstances. This adaptation can include adjusting the contents in the packages in terms of volume, formats and quality. For example, when a client is unable to display moving graphics, such media contents will be excluded from the packages, and when a client has poor memory and/or processor capacity, audio files may be transformed to a lower quality. These adapted media packages are then sent to the client using the communication means.

It should be noted that the technical factors above have slightly different character. For example, while the available software components normally are constant during a session, factors relating to the real time network transfer can change continuously. Another category of factors can be referred to as situational factors, for example regarding what the user is doing (e.g. riding a bus or driving a car), and can be expected to change a few times during a session. Therefore, communication of technical factors should be performed with a frequency depending on the factor category.

The feeder node can additionally include software 26 for local management functions like setting up and maintaining user groups, new personalization node connections and backup routines.

Figure 7:
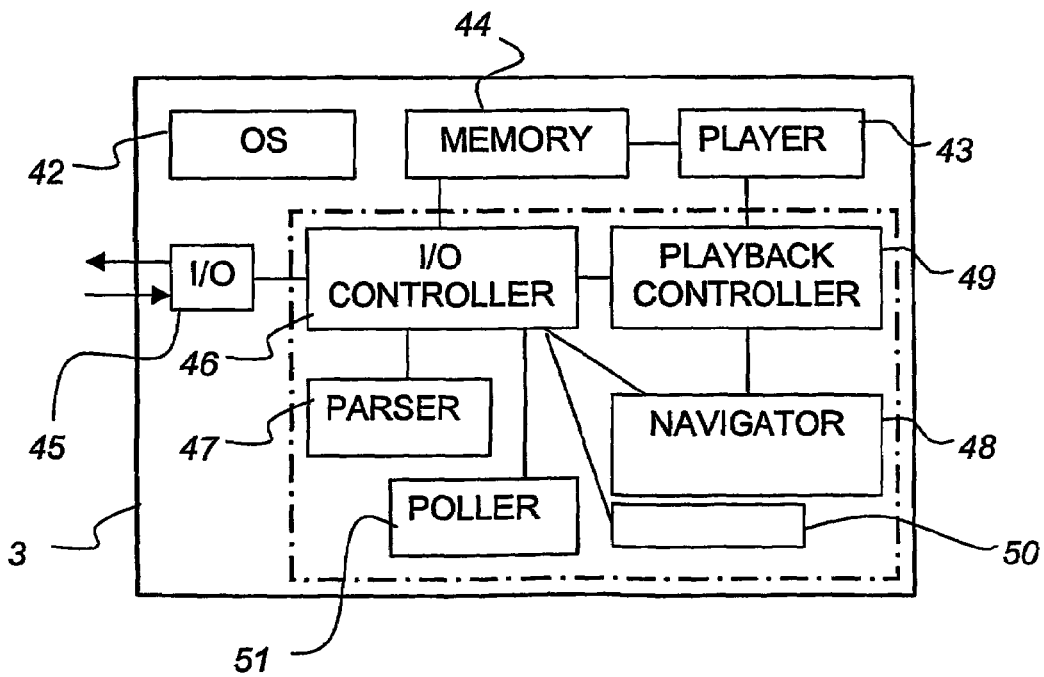
FIG. 7 is a navigator according to the invention.

A client 3 according to a preferred embodiment is illustrated in FIG. 7. The client is a handheld unit such as a PDA or cellular communication device, and preferably a GPRS/UMTS enabled device. The client software controls reception of media packages from the network, and stores the packages locally on the device. The client software also holds functionality for navigation in and seamless playback of the packages. In FIG. 7, the software components referenced 41 are characteristic for the invention, and referred to as the navigator. The other components are resident in a default device of the mentioned kind. Obviously, the navigator 41 includes interfaces with the clients software platform 42, its different software components 43 (e.g. media players), its local memory 44, and its I/O-unit 45.

The navigator 41 includes means 46 to control the I/O-unit 45 to download media packages 31 from the feeder 6, and means 51 to regularly poll the media package status at the feeder 6. When a channel is extended by the content provider, the previously downloaded media package structure will be somewhat obsolete, and the polling serves to update the structure. Downloaded media content is stored in the media package structure or in a normal sequential format in the local memory 44 of the device.

The navigator further includes means 47 to parse the media package structure, means 48 to navigate in the structure, and means 49 to control playback functionality in terms of user interaction (buttons, voice) and players (start, stop, skip forward and backward, pause). This part of the navigator is basically a user interface, easily developed by the skilled man and adapted to the software on the intended device.

The navigator software also includes means 50 to monitor and communicate status information of the type mentioned above in relation to the feeder. The information is preferably pushed to the feeder, as it normally reflects changes occurring on the client side.

Figure 8:
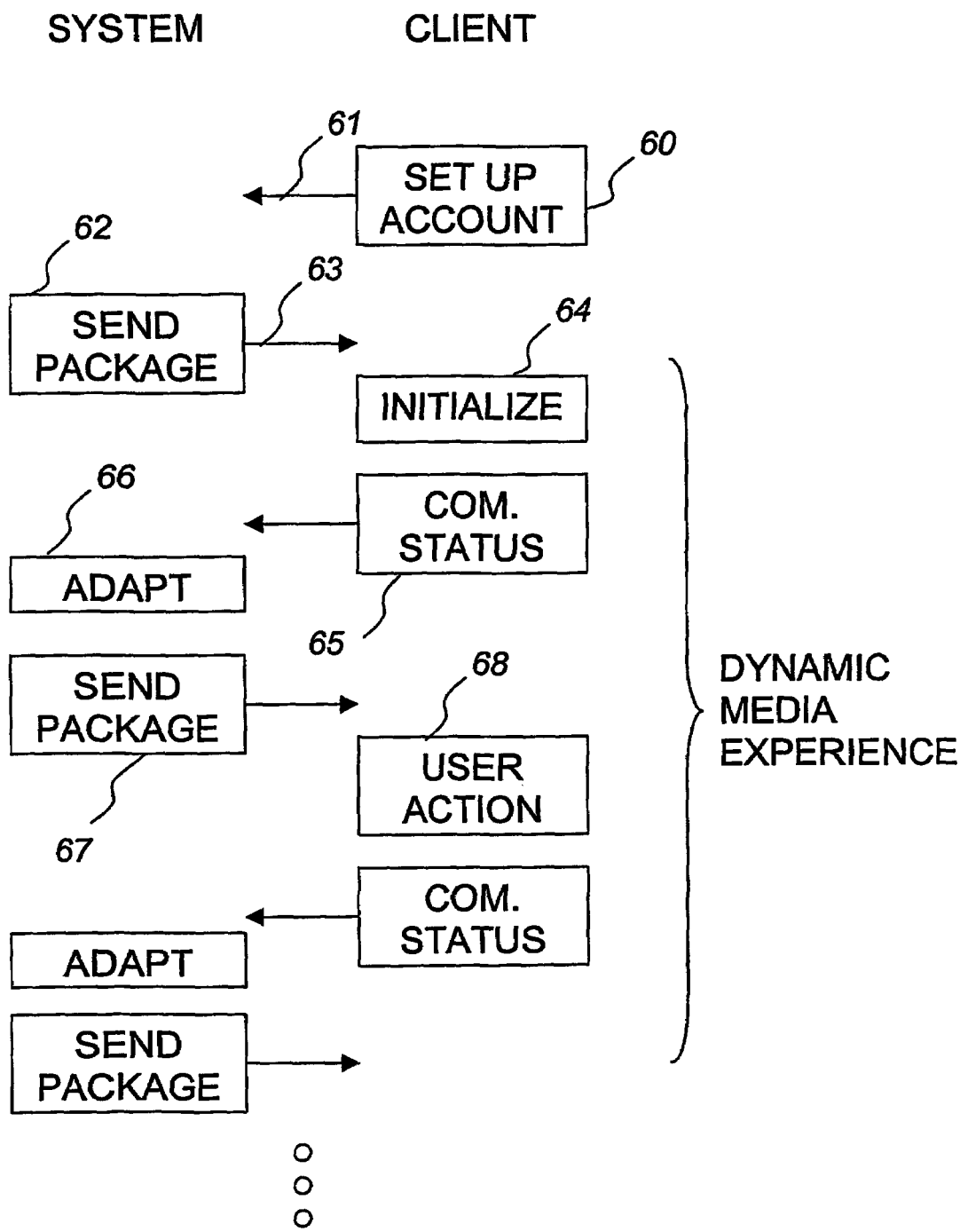
FIG. 8 is an example embodiment of a sequence diagram according to the invention.

The function of the described system is briefly as follows, with reference to FIG. 8. A user establishes an account 60 with a service provider, and defines a profile 61 which is communicated to the intermediate node. The selected channel(s) are then transferred 62 to the client in the form of one or several personalized media packages 63 having structure but no or very few subjects. This structure is regularly updated through a polling process. When the user desires to consume media, the structure is initialized 64, and status information is communicated 65 to the feeder. In response to this status information, the personalized structure is adapted 66, and a new, updated package, including a few subjects, is sent 67 to the client. The subjects are played in their predefined order, unless the user selects a different path in the structure. Such a user action 68 will prompt the download of a new media package, containing subjects in this area of the structure. In this way, the user experiences a dynamic broadcast.

The nodes described above can be conventional type severs, including standard OS and software for main process handling. The different described software components of the nodes can be realized by the skilled man without greater difficulties. Standard network protocols and languages can be used for transfer of files as well as synchronization and control data between different nodes. Handling of the databases in the nodes can also be accomplished with conventional techniques.

The invention lies not in the detailed development of the software components, but rather in the design of the general methods allowing the existing network technology to be used in an optimal way to give the user a satisfying media experience.

The invention claimed is:

1. A method for providing media content to a user over a digital network, which media content is provided by a media content server, organized and selected by an intermediate node in accordance to previously stored user preferences, and delivered to a client operated by the user, in the form of media package including playable media subjects, comprising:
   defining a personalized media package structure, said personalized media package structure defining a relationship between the media subjects and a structure for navigating in the media package,
   communicating a first package including the media subjects organized according to said personalized media package structure to the client,
   receiving status information from the client, said status information describing a user action,
   adapting said personalized media package structure in response to said user action, and
   communicating a second package including the media subjects organized according to said adapted personalized media package structure to the client, in response to the user action.

2. A method according to claim 1, wherein said status information further includes an indication of the currently available network transmission speed, and wherein media subjects unsuitable for the available transmission speed are replaced or excluded from said package.

3. A method according to claim 2, wherein said status information further includes an indication of the media formats supported by the client media player, and wherein media subjects having a format not supported by said media player are replaced or excluded from said package.

4. A method according to claim 2, wherein said status information further includes an indication of the type of situation the user is currently in.

5. A computer program product, comprising software code portions stored on computer storage medium for performing the steps of claim 1, when said product is run on a computer.

6. A storage medium having stored thereon a computer program product according to claim 5.

7. A method according to claim 1, wherein said second package includes a different media package structure with respect to said first package.

8. A method for receiving media contents to a client from an intermediate node in a digital network, which media content is provided by a media content server, organized and selected by said intermediate node in accordance to previously stored user preferences, in the form of media packages including playable media subjects, comprising:
   receiving a first package including the media subjects organized according to a personalized media package structure, said personalized media package structure defining a relationship between the media subjects and a structure for navigating in the media package,
   communicating status information to the intermediate node, said status information describing a user action, and
   receiving a second package including the media subjects organized according to the personalized package structure adapted in response to said user action.

9. A method according to claim 8, wherein said status information further includes an indication of the currently available network transmission speed, and wherein media subjects unsuitable for the available transmission speed are replaced or excluded from said package.

10. A method according to claim 9, wherein said status information further includes an indication of the media formats supported by the client media player, and wherein media subjects having a format not supported by said media player are replaced or excluded from said package.

11. A method according to claim 9, wherein said status information further includes an indication of the type of situation the user is currently in.

12. A method according to claim 8, wherein said second package includes a different media package structure with respect to said first package.

13. A device for providing media content to a user over a digital network, which media content is provided by a media content server, organized and selected by an intermediate node in accordance to previously stored user preferences, and delivered to a client operated by the user in the form of media packages having playable media subjects,
   comprising means for:
   defining a personalized media package structure, said personalized media package structure defining a relationship between the media subjects and a structure for navigating in the media package,
   communicating a first package including the media subjects organized according to said personalized media package structure to the client,
   receiving status information from the client, said status information describing a user action,
   adapting said personalized media package structure in response to said consumption behavior, and
   communicating a second package including the media subjects organized according to said adapted personalized media package structure to the client, in response to the user action.

14. A device for receiving media contents to a client from an intermediate node in a digital network, which media content is provided by a media content server, organized and selected by said intermediate node in accordance to previously stored user preferences in the form of media packages having playable media subjects, comprising means for:
   receiving a first package including the media subjects organized according to a personalized media package structure, said personalized media package structure defining a relationship between the media subjects and a structure for navigating in the media package,
   communicating status information to the intermediate node, said status information describing a user action, and
   receiving a second package including the media subjects organized according to a personalized package structure adapted in response to said user action.

* * * * *